United States Patent
Binek et al.

(10) Patent No.: US 11,684,954 B2
(45) Date of Patent: Jun. 27, 2023

(54) REMOVING DEBRIS FROM AN ENGINE COMPONENT

(71) Applicant: Raytheon Technologies Corporation, Farmington, CT (US)

(72) Inventors: Lawrence A. Binek, Glastonbury, CT (US); Jose R. Paulino, Jupiter, FL (US)

(73) Assignee: Raytheon Technologies Corporation, Farmington, CT (US)

( * ) Notice: Subject to any disclaimer, the term of this patent is extended or adjusted under 35 U.S.C. 154(b) by 0 days.

(21) Appl. No.: 17/535,101

(22) Filed: Nov. 24, 2021

(65) Prior Publication Data
US 2023/0158554 A1    May 25, 2023

(51) Int. Cl.
  *B08B 3/04*    (2006.01)
  *B33Y 10/00*   (2015.01)
  *B33Y 40/00*   (2020.01)
  *B33Y 80/00*   (2015.01)

(52) U.S. Cl.
  CPC ............. *B08B 3/04* (2013.01); *B33Y 10/00* (2014.12); *B33Y 40/00* (2014.12); *B33Y 80/00* (2014.12)

(58) Field of Classification Search
  CPC ........... B08B 3/04; B33Y 10/00; B33Y 40/00; B33Y 80/00
  See application file for complete search history.

(56) References Cited

U.S. PATENT DOCUMENTS

| | | | |
|---|---|---|---|
| 4,898,329 A | 2/1990 | Davis | |
| 6,931,862 B2 | 8/2005 | Harris | |
| 9,062,609 B2 | 6/2015 | Mehring | |
| 10,060,628 B2 | 8/2018 | Johnson | |
| 2019/0353060 A1* | 11/2019 | Amano | F15B 15/12 |
| 2020/0332719 A1 | 10/2020 | Binek | |
| 2020/0398386 A1 | 12/2020 | Binek | |
| 2020/0400314 A1 | 12/2020 | Binek | |
| 2021/0277838 A1 | 9/2021 | Patel | |

FOREIGN PATENT DOCUMENTS

DE    202012008350 U1    10/2012

* cited by examiner

Primary Examiner — Rick K Chang
(74) Attorney, Agent, or Firm — Getz Balich LLC

(57) ABSTRACT

An engine component is configured with a component fluid passage and a receptacle. The component fluid passage extends within the engine component to the receptacle. The receptacle extends through the engine component between a receptacle first end and a receptacle second end. A fluid diverter is configured with a diverter fluid passage and a port. The fluid diverter extends between a diverter first end and a diverter second end. The diverter fluid passage extends partially into the fluid diverter from the diverter first end. The fluid diverter is mated with the receptacle. The diverter first end is disposed at the receptacle first end. The diverter plugs a portion of the receptacle at the diverter second end. The port fluidly couples the component fluid passage to the diverter fluid passage. Fluid is directed through the component fluid passage into the diverter fluid passage to remove debris from the engine component.

14 Claims, 12 Drawing Sheets

REMOVING DEBRIS FROM AN ENGINE COMPONENT

BACKGROUND OF THE DISCLOSURE

1. Technical Field

This disclosure relates generally to an engine and, more particularly, to a removing debris from a component of the engine.

2. Background Information

A gas turbine engine may include a fluid passage integrated into a component. Where the fluid passage has a tortuous geometry and/or is located deep within the engine component, it may be difficult to remove debris (e.g., left over additive manufacturing powder, machining remnants, etc.) from the fluid passage in a post formation step. Left over debris within the fluid passage may negatively affect gas turbine engine operation. There is a need in the art therefore of apparatuses and methods for removing debris from an internal fluid passage.

SUMMARY OF THE DISCLOSURE

According to an aspect of the present disclosure, a method is provided. During this method, an engine component is provided which is configured with a component fluid passage and a receptacle. The component fluid passage extends within the engine component to the receptacle. The receptacle extends through the engine component between a receptacle first end and a receptacle second end. A fluid diverter is provided which is configured with a diverter fluid passage and a port. The fluid diverter extends between a diverter first end and a diverter second end. The diverter fluid passage extends partially into the fluid diverter from the diverter first end. The fluid diverter is mated with the receptacle. The diverter first end is disposed at the receptacle first end. The diverter plugs a portion of the receptacle at the diverter second end. The port fluidly couples the component fluid passage to the diverter fluid passage. Fluid is directed through the component fluid passage into the diverter fluid passage to remove debris from the engine component.

According to another aspect of the present disclosure, another method is provided. During this method, an engine component is provided that includes a component fluid passage and a receptacle. The component fluid passage extends within the engine component to an opening in the receptacle. A fluid diverter is provided that includes a head, a shank, a diverter fluid passage and a port. The shank projects out from the head to a distal end. The diverter fluid passage extends through the head and partially into the shank towards the distal end. The port extends through a sidewall of the shank to the diverter fluid passage. The shank is threaded into the receptacle to attach the fluid diverter to the engine component. The port fluidly couples the component fluid passage to the diverter fluid passage. Debris from the engine component is removed. This removing of the debris includes directing fluid through the component fluid passage into the diverter fluid passage.

According to still another aspect of the present disclosure, a fluid diverter with a longitudinal centerline is provided. This fluid diverter includes a head, a shank, a fluid passage and a port. The head is configured with a wrenching feature. The shank is connected to the head. The shank projects longitudinally out from the head to a distal end. The shank includes a first section and a second section. The first section is configured with external threads and is disposed longitudinally between the head and the second section. The second section is disposed longitudinally between the first section and the distal end. The fluid passage extends longitudinally through the head and partially longitudinally into the shank towards the distal end. The port extends laterally through a sidewall of the second section to the fluid passage.

The head may be configured with a wrenching feature.

A threaded portion of the shank may be between the head and the port.

The receptacle may extend through the engine component between a receptacle first end and a receptacle second end. The head may be disposed at the receptacle first end. The shank may plug a portion of the receptacle between the opening and the receptacle second end.

The head may be configured with a polygonal cross-sectional geometry.

The port may extend longitudinally within the sidewall. The port may extend circumferentially within the sidewall and about the longitudinal centerline at least two radians.

The fluid diverter may include a second port extending laterally through the sidewall to the fluid passage.

The fluid diverter may include a first seal element and a second seal element. The first seal element may be mounted on and may circumscribe the shank on a first longitudinal side of the port. The second seal element may be mounted on and may circumscribe the shank on a second longitudinal side of the port that is longitudinally opposite the first longitudinal side.

The providing of the engine component may include additively manufacturing the engine component. The debris may be configured as or otherwise include powder within the component fluid passage that is left over from the additively manufacturing of the engine component.

The debris may be configured as or otherwise include material within the component fluid passage that is left over from manufacturing of the engine component.

The engine component may be configured as or otherwise include a fuel manifold for a turbine engine.

The engine component may be configured as or otherwise include a case for a turbine engine.

The method may also include removing the fluid diverter from the receptacle subsequent to the directing of the fluid through the component fluid passage.

The method may also include mating an injector with the receptacle subsequent to the removal of the fluid diverter from the receptacle. The injector may plug a portion of the receptacle at the receptacle first end.

The fluid diverter may be configured as a bolt that threads into the receptacle during the mating of the fluid diverter with the receptacle.

The engine component may also be configured with a second component fluid passage extending within the engine component to the receptacle. The fluid diverter may block an opening to the second component fluid passage from the receptacle.

The engine component may also be configured with a second component fluid passage extending within the engine component to the receptacle. The fluid diverter may also be configured with a second port that fluidly couples the second component fluid passage to the diverter fluid passage.

The method may also include: providing a second fluid diverter configured with a second diverter fluid passage and a second port, the second fluid diverter extending between a second diverter first end and a second diverter second end, and the second diverter fluid passage extending partially into the second fluid diverter from the second diverter first end; mating the second fluid diverter with a second receptacle that is fluidly coupled with the component fluid passage, the second receptacle extending through the engine component between a second receptacle first end and a second receptacle second end, the second diverter first end disposed at the second receptacle first end, the second diverter plugging a portion of the second receptacle at the second diverter second end, and the second port fluidly coupling the component fluid passage to the second diverter fluid passage; and directing the fluid through the second diverter fluid passage and into the component fluid passage towards the diverter fluid passage.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

Figure 1:
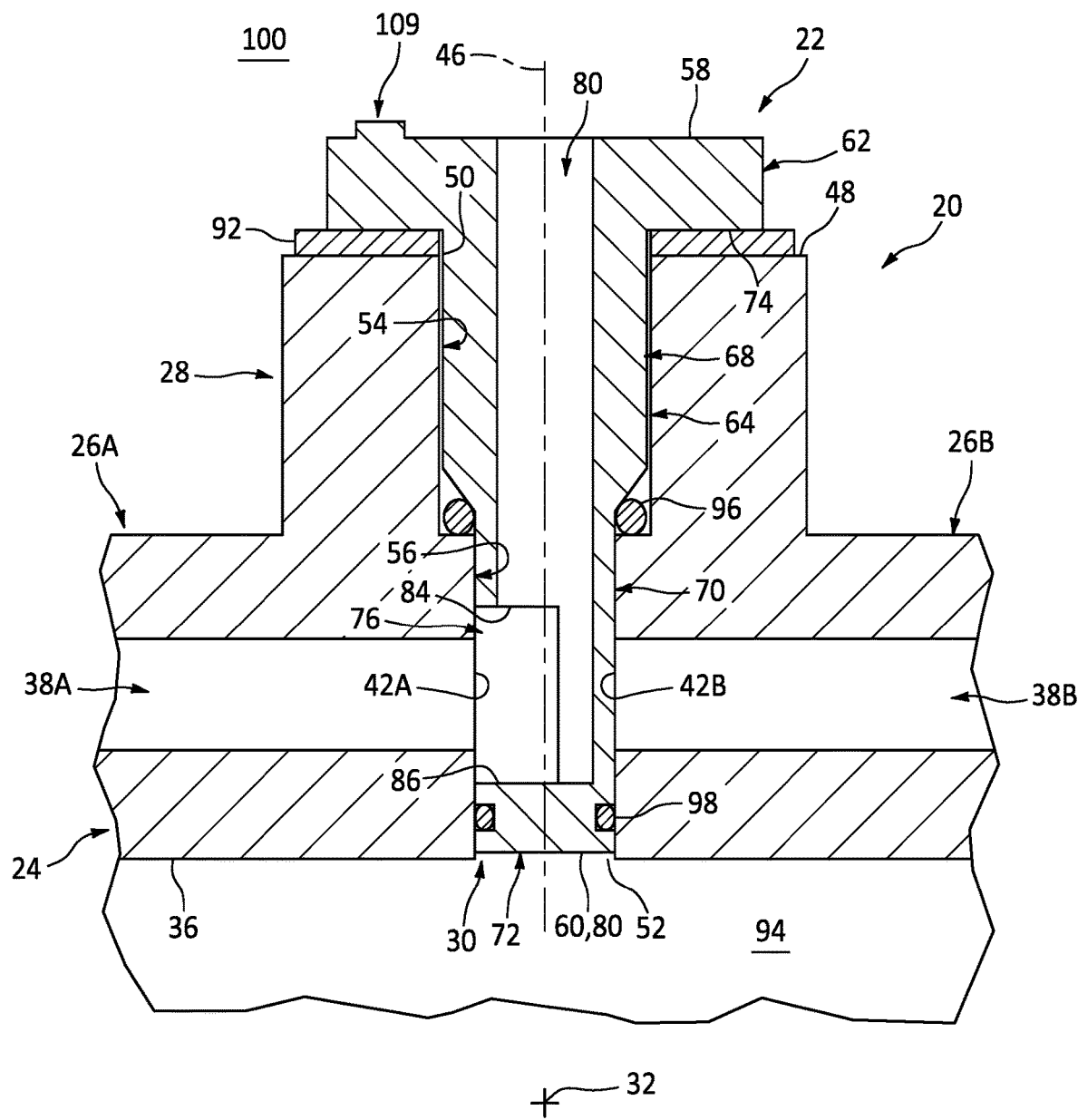
FIG. 1 is a partial sectional illustration of a fluid diverter mated with an engine component viewed in a first reference plane perpendicular to an axis.
Figure 2:
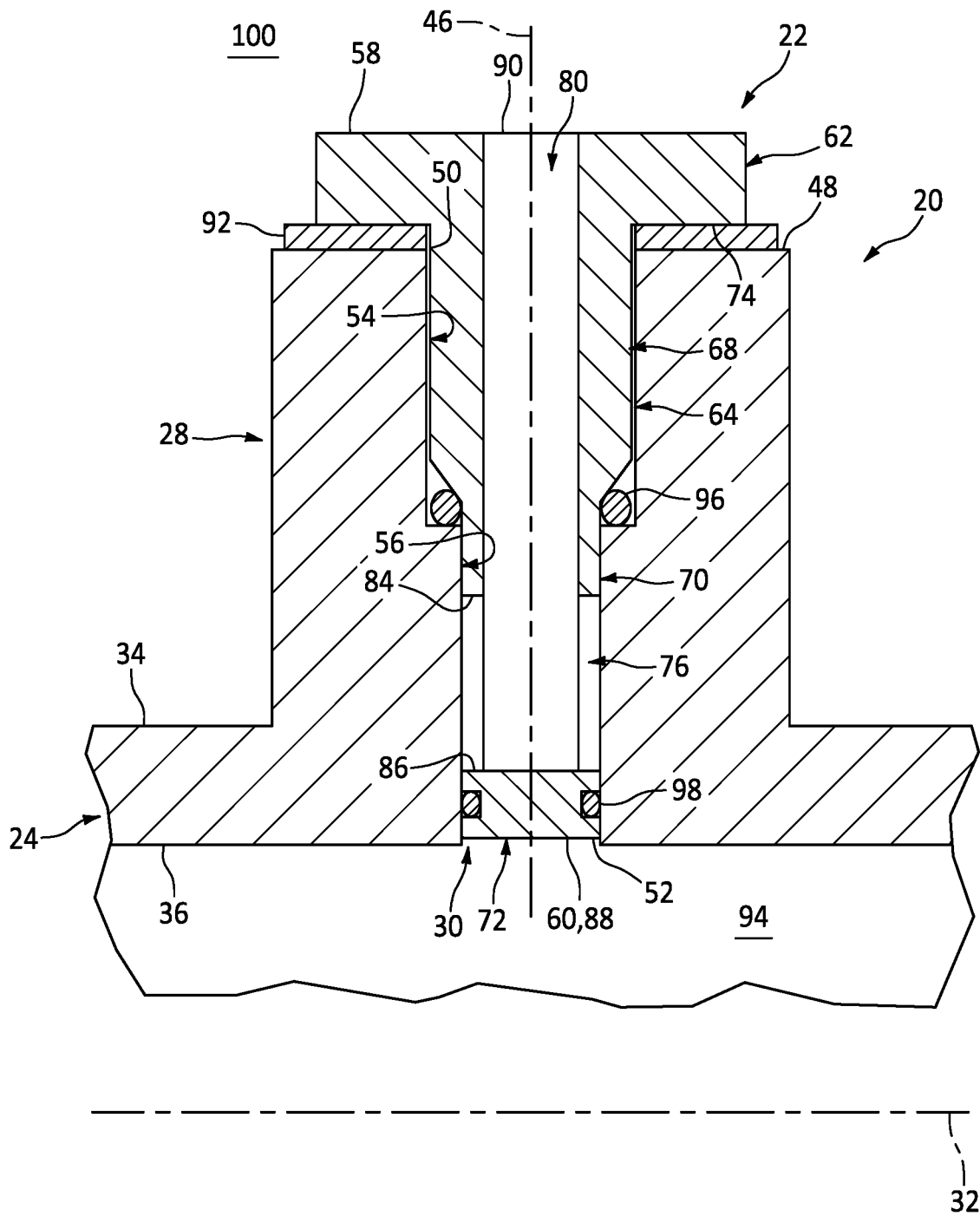
FIG. 2 is a partial sectional illustration of the fluid diverter mated with the engine component viewed in a second reference plane parallel with the axis.

FIGS. 1 and 2 illustrate an engine component 20 mated with a fluid diverter 22. The engine component 20 is configured as part of a fluid delivery system for an internal combustion (IC) engine. For ease of description, this engine is described below as a gas turbine engine. The present disclosure, however, is not limited to gas turbine engine applications. For example, the engine may alternatively be configured as a reciprocating piston engine, a rotary engine, or any other type of engine where fuel is continuously or periodically injected into chamber or another internal volume (e.g., an open space) for combustion. Also for ease of description, the fluid delivery system is described below as a fuel delivery system. The engine component 20, for example, may be configured as or included as part of a fuel manifold for the engine. The present disclosure, however, is not limited to fuel delivery applications. Fluid flowed within/delivered by the fluid delivery system during engine operation, for example, may also or alternatively facilitate heat transfer (e.g., heating and/or cooling) and/or lubrication for the engine component and/or one or more other components of the engine.

Figure 3:
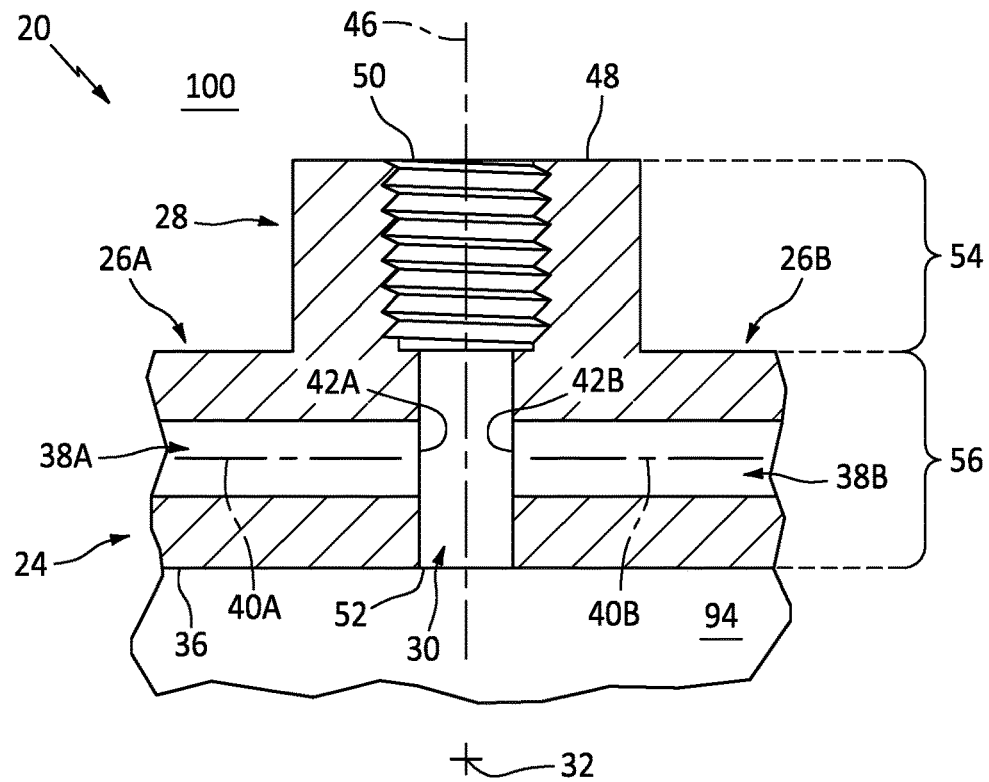
FIG. 3 is a partial sectional illustration of the engine component viewed in the first reference plane.
Figure 4:
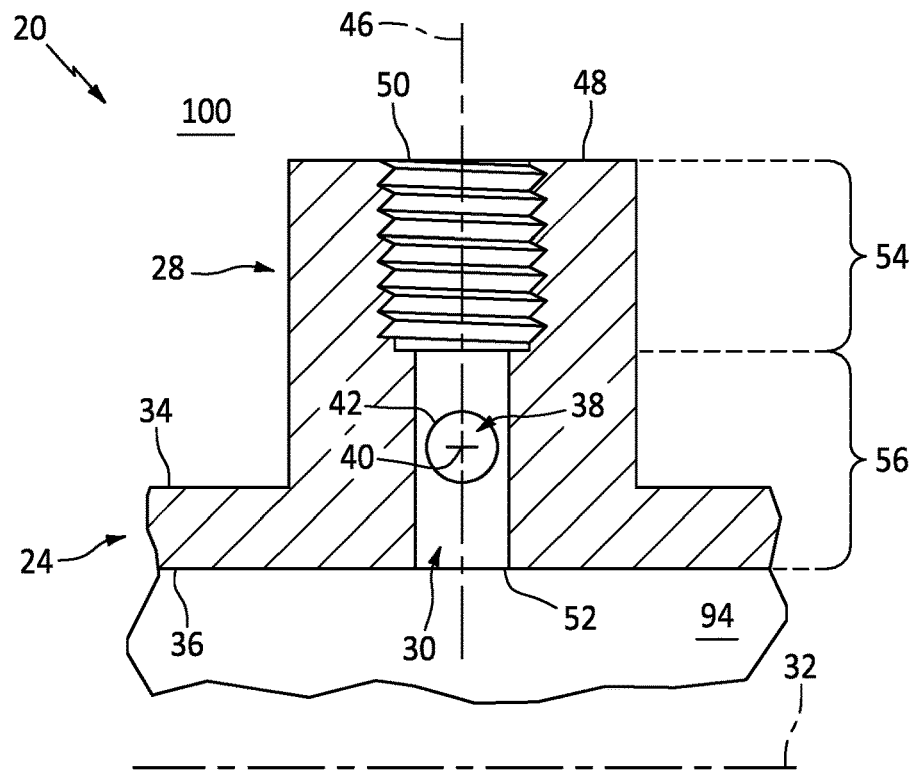
FIG. 4 is a partial sectional illustration of the engine component viewed in the second reference plane.

Referring to FIGS. 3 and 4, the engine component 20 is configured as an engine casing such as, but not limited to, a combustor section case, a diffuser case and/or a combustor wall (e.g., a liner wall, a bulkhead wall, etc.). This engine component 20 includes a case wall 24, one or more fluid conduits 26A and 26B (generally referred to as "26") (e.g., fuel conduits), at least one mounting boss 28 (e.g., a fuel injector mount) and at least one component receptacle 30 (e.g., a fuel injector aperture).

The case wall 24 may be configured as an arcuate or tubular member. The case wall 24 of FIGS. 3 and 4, for example, extends axially along a centerline axis 32 of the engine component 20, which engine component centerline axis 32 may be coaxial with a centerline axis and/or a rotational axis of the engine. The case wall 24 extends circumferentially about (e.g., partially or completely around) the engine component centerline axis 32. The case wall 24 of FIG. 4 extends radially between a first (e.g., exterior, outer) side 34 of the case wall 24 and a second (e.g., interior, inner) side 36 of the case wall 24, which case wall second side 36 is radially opposite the case wall first side 34.

The fluid conduits 26 of FIG. 3 may be arranged on laterally (e.g., circumferentially) opposing sides of the mounting boss 28 and the receptacle 30. Each of the fluid conduits 26 is disposed at and/or is connected to the case wall first side 34; see FIG. 4. Each of the fluid conduits 26 is configured with an internal component fluid passage 38A, 38B (generally referred to as "38"); e.g., a fuel supply passage. This component fluid passage 38 may be formed by an internal bore and/or channel within the respective fluid conduit 26. The component fluid passage 38 extends within and/or through the respective fluid conduit 26 along a (e.g., curved and/or straight) centerline 40A, 40B (generally referred to as "40") of the component fluid passage 38 to a respective component fluid passage opening 42A, 42B (generally referred to as "42") (e.g., an orifice), which fluid passage centerline 40 may also be a centerline of the fluid conduit 26.

Figure 11:
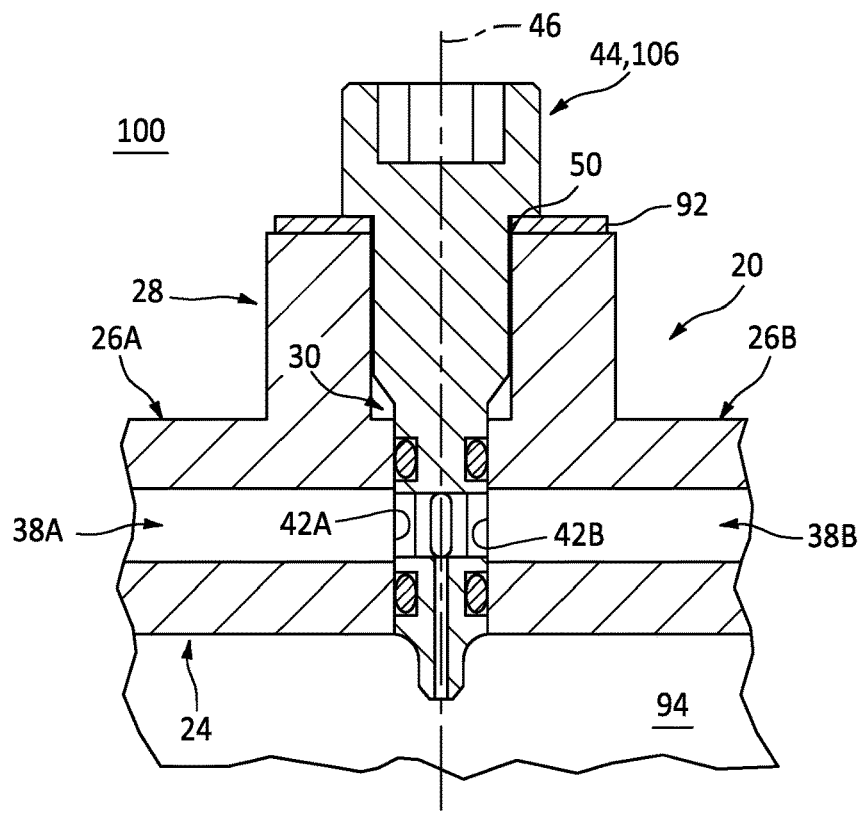
FIG. 11 is a partial sectional illustration of a fluid injector mated with the engine component.

The mounting boss 28 is configured for mounting the fluid diverter 22 (see FIGS. 1 and 2), as well as other devices such as a fuel injector 44 (see FIG. 11), to the engine component 20. The mounting boss 28 of FIGS. 3 and 4, for example, is a tubular member arranged at and/or connected to the case wall first side 34. This mounting boss 28 projects longitudinally out from the case wall 24 and its first side 34 along a longitudinal centerline 46 (e.g., a centerline of the mounting boss 28) to a distal end 48 of the mounting boss 22.

The receptacle 30 may be formed by an internal bore and/or channel within the engine component 20. The receptacle 30 extends longitudinally along the longitudinal centerline 46 (e.g., a centerline of the receptacle 30) through the engine component 20 to and between a first (e.g., exterior, outer) end 50 of the receptacle 30 and a second (e.g., interior, inner) end 52 of the receptacle 30, which receptacle second end 52 is longitudinally opposite the receptacle first end 50. The receptacle first end 50 is arranged at the mounting boss distal end 48. The receptacle second end 52 is arranged at the case wall second side 36. The receptacle 30 of FIGS. 3 and 4 thereby extends longitudinally along the longitudinal centerline 46 from the mounting boss distal end 48, through the mounting boss 28 and the case wall 24, to the case wall second side 36.

The receptacle 30 may include a threaded portion 54 and a non-threaded portion 56. The receptacle threaded portion 54 is a tapped portion of a sidewall of the receptacle 30. The receptacle threaded portion 54 is disposed at (e.g., on, adjacent or proximate) the receptacle first end 50. The receptacle non-threaded portion 56 is an untapped (e.g., smooth, cylindrical) portion of the receptacle sidewall. The receptacle non-threaded portion 56 is disposed at the receptacle second end 52.

Each passage opening 42 is disposed along an intermediate region of the receptacle 30. Each passage opening 42, for example, is located longitudinally (e.g., midway) between the receptacle first end 50 and the receptacle second end 52 along the longitudinal centerline 46. Each passage opening 42 of FIGS. 3 and 4, in particular, is disposed in the untapped portion of the receptacle sidewall—in the receptacle non-threaded portion 56. Each component fluid passage 38 is thereby fluidly coupled with the receptacle 30 and its non-threaded portion 56 through its respective passage opening 42.

Figure 5:
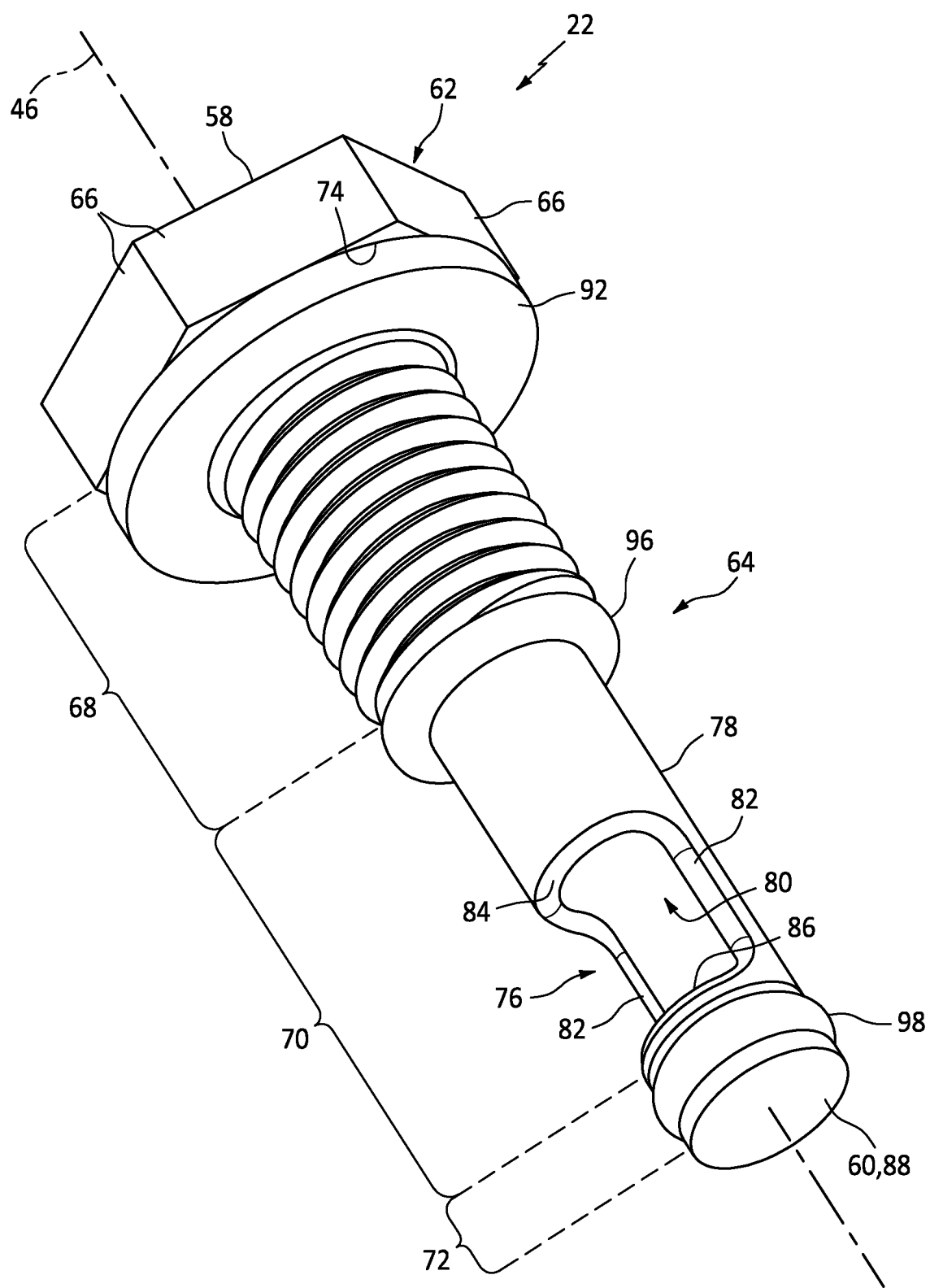
FIG. 5 is a perspective illustration of the fluid diverter mated with a washer and one or more seal elements.

Referring to FIG. 5, the fluid diverter 22 may be configured as an apertured fluid bolt; e.g., a debris evacuation bolt, a manifold clearance bolt, etc. The fluid diverter 22 of FIG. 5, in particular, extends longitudinally along the longitudinal centerline 46 (e.g., a centerline of the fluid diverter 22) between and to a first (e.g., exterior, outer) end 58 of the fluid diverter 22 and a second (e.g., interior, inner) end 60 of the fluid diverter 22, which diverter second end 60 is longitudinally opposite the diverter first end 58. The fluid diverter 22 of FIG. 5 includes a diverter head 62 and a diverter base 64, where the diverter head 62 may be a head of the fluid bolt and the diverter base 64 may be a shank of the diverter base 64.

Figure 6:
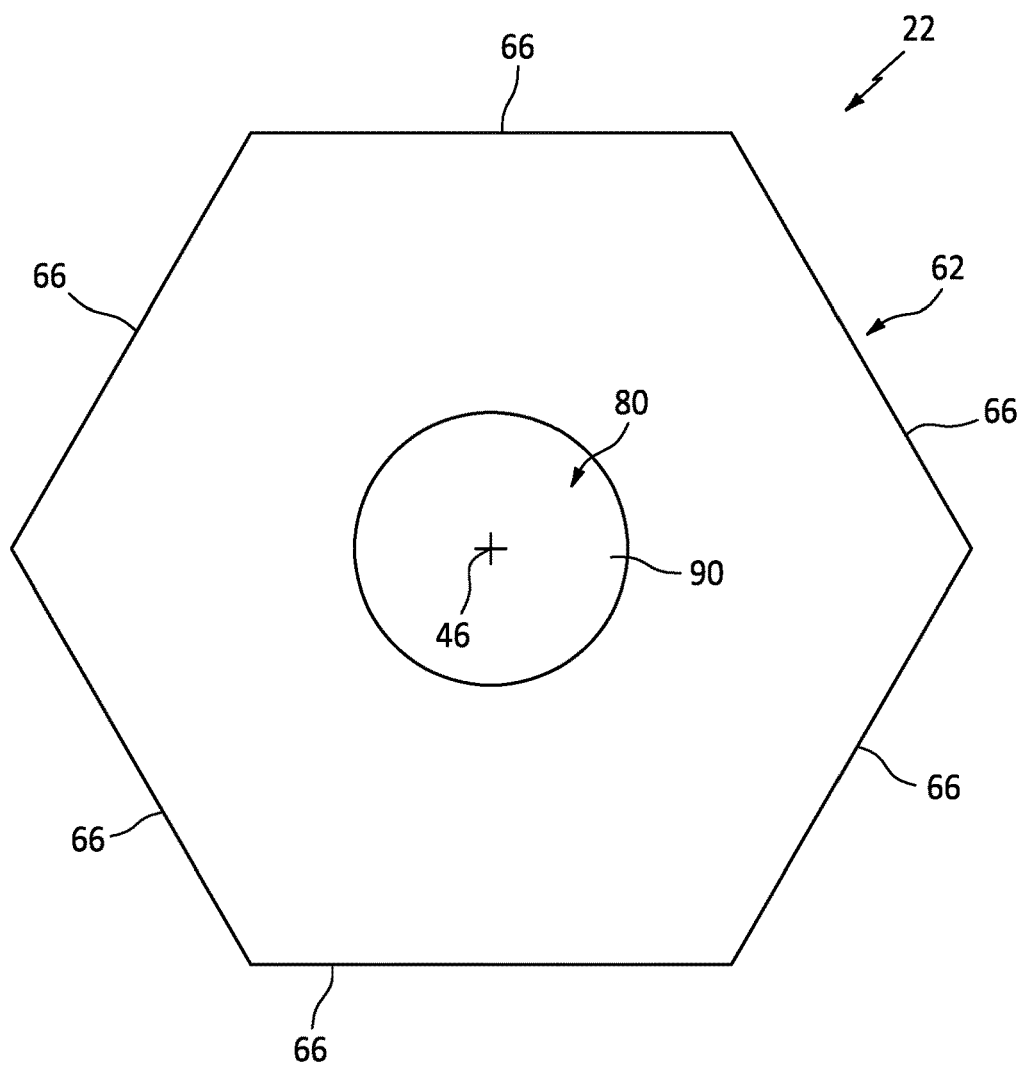
FIG. 6 is an end view illustration of the fluid diverter.

The diverter head 62 is connected to the diverter base 64 and arranged at the diverter first end 58. Referring to FIG. 6, the diverter head 62 may be configured with a wrenching feature. An exterior of the diverter head 62 of FIG. 6, for example, is configured with one or more flats 66; e.g., planer surfaces. These flats 66 are distributed circumferentially about the longitudinal centerline 46. The flats 66 of FIG. 6 provide the diverter head 62 with a polygonal (e.g., hexagonal) cross-sectional geometry when viewed, for example, in a reference plane perpendicular to the longitudinal centerline 46.

Referring to FIG. 5, the diverter base 64 projects longitudinally along the longitudinal centerline 46 from the diverter head 62 to the diverter second end 60. The diverter base 64 of FIG. 5 includes a plurality of sections such as, but not limited to, a (e.g., threaded) diverter mount 68, a fluid coupler 70 and a receptacle plug 72.

The diverter mount 68 is longitudinally between and connected to the diverter head 62 and the fluid coupler 70. The diverter mount 68 of FIG. 5, for example, extends longitudinally along the longitudinal centerline 46 between and to the diverter head 62 and the fluid coupler 70. An exterior of the diverter mount 68 is configured with threads for mating with the receptacle threaded portion 54; see FIGS. 1 and 2. The threaded exterior of the diverter mount 68 may be laterally (e.g., radially relative to the longitudinal centerline 46) recessed from the exterior of the diverter head 62 such that a (e.g., annular) head shoulder 74 (see also FIG. 7) extends laterally between the elements 62 and 68 and circumferentially around the longitudinal centerline 46.

Figure 7:
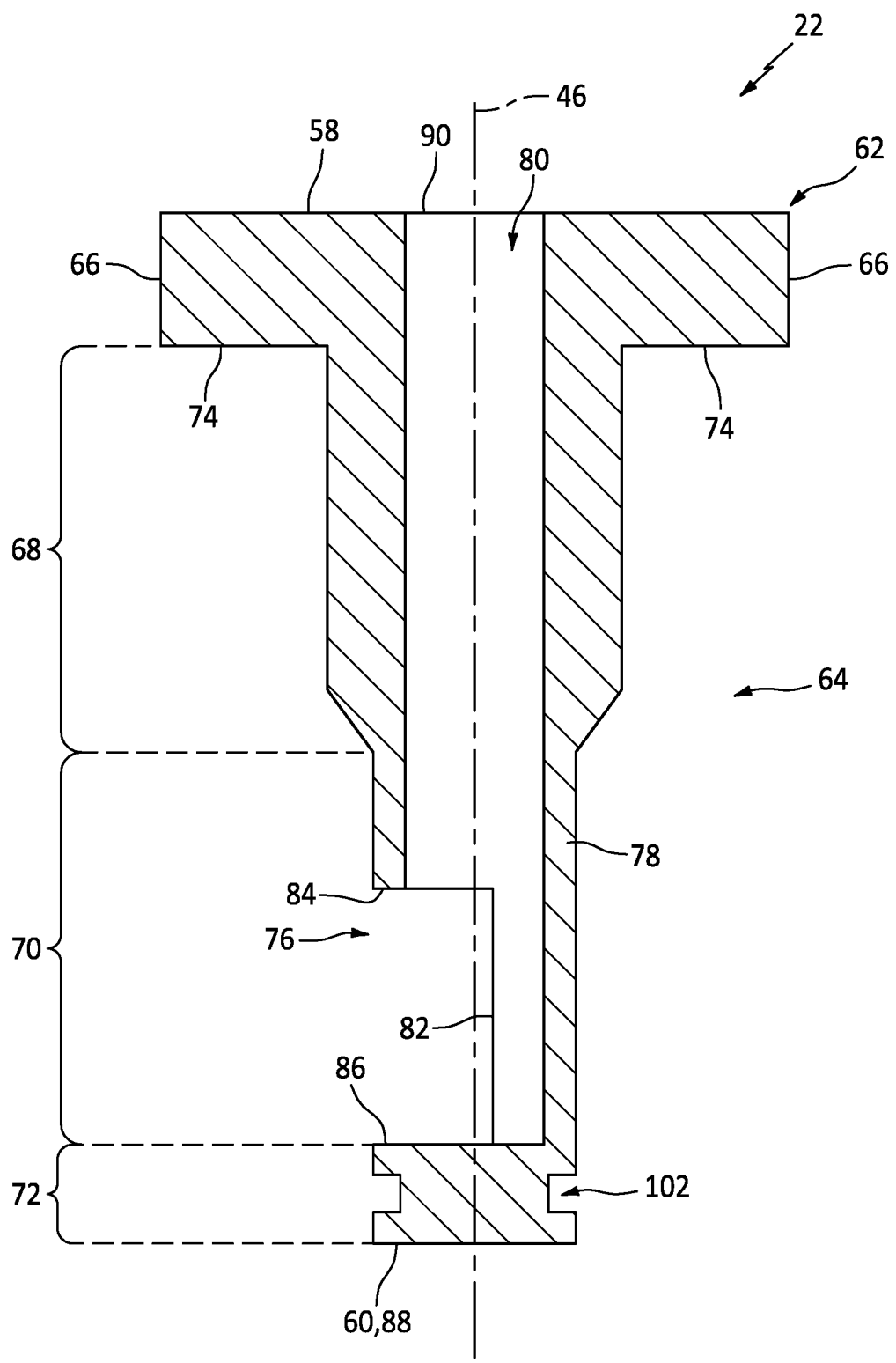
FIG. 7 is a sectional illustration of the fluid diverter.

Referring to FIG. 7, the fluid coupler 70 is longitudinally between and connected to the diverter mount 68 and the receptacle plug 72. The fluid coupler 70 of FIG. 7, for example, extends longitudinally along the longitudinal centerline 46 to and between the diverter mount 68 and the receptacle plug 72. The fluid coupler 70 is configured with a lateral width (e.g., a diameter) that is less than a lateral width (e.g., a diameter) of the diverter mount 68.

Figure 8:
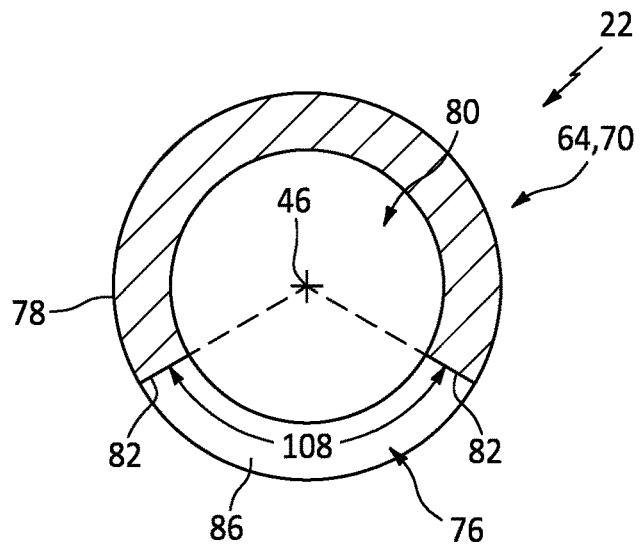
FIG. 8 is a cross-sectional illustration of the fluid diverter.

The fluid coupler 70 includes at least one port 76; e.g., an aperture, a window, a pass-through, etc. Referring to FIGS. 7 and 8, the port 76 extends laterally (e.g., radially relative to the longitudinal centerline 46) through a tubular sidewall 78 of the diverter base 64 to an internal diverter fluid passage 80 within the fluid diverter 22. The port 76 extends circumferentially around the longitudinal centerline 46 within the base sidewall 78 between opposing circumferential sides 82 of the port 76. Referring to FIG. 7, the port 76 extends longitudinally along the longitudinal centerline 46 within the base sidewall 78 between opposing longitudinal sides 84 and 86 of the port 76.

The receptacle plug 72 is connected to the fluid coupler 70. The receptacle plug 72 of FIG. 7, for example, projects longitudinally along the longitudinal centerline 46 from the fluid coupler 70 to a distal end 88 of the diverter base 64 at the diverter second end 60. The receptacle plug 72 is a solid portion of the fluid diverter 22. The receptacle plug 72, for example, may be configured without any pathways through which fluid (e.g., cleaning solution) may to travel (e.g., laterally and/or longitudinally) thereacross. More particularly, the receptacle plug 72 of FIG. 5 is configured without any apertures, bores, channels, etc. extending laterally and/or longitudinally through the receptacle plug 72.

The diverter fluid passage 80 is formed by an internal bore of the fluid diverter 22. This diverter fluid passage 80 projects longitudinally along the longitudinal centerline 46 into the fluid diverter 22 from the diverter first end 58 towards (e.g., but not to) the diverter second end 60/the base distal end 88. More particularly, the diverter fluid passage 80 extends longitudinally through the diverter head 62 and partially longitudinally into the diverter base 64 towards (e.g., to) the receptacle plug 72. The diverter fluid passage 80 of FIG. 7 is thereby configured as a blind passage. An opening 90 (e.g., an orifice) to the diverter fluid passage 80 at the diverter first end 58 provides, for example, an outlet for the fluid diverter 22.

Referring to FIGS. 1 and 2, the fluid diverter 22 is mated with (e.g., inserted and/or threaded) into the receptacle 30. For example, during mating, the fluid diverter 22 is inserted longitudinally into the receptacle 30 at the receptacle first end 50. The receptacle plug 72 is moved longitudinally through the receptacle threaded portion 54 and into the receptacle non-threaded portion 56. The external threads of the diverter mount 68 are mated with the internal threads of the receptacle threaded portion 54. The fluid diverter 22 is threaded (e.g., screwed) into the receptacle 30 using a tool (e.g., a wrench; not shown) until, for example, the head shoulder 74 is longitudinally abutted and preloaded against a surface on the boss distal end 48. Engagement between the head shoulder 74 and the mounting boss 28 may be an indirect engagement through, for example, a washer 92, or a direct engagement (e.g., contact) where the washer 92 is omitted. The fluid diverter 22 is thereby removably attached to the engine component 20 by a threaded interface between the interior threads on the sidewall of the receptacle threaded portion 54 and the exterior threads on the diverter mount 68.

In the assembled position of FIG. 1, the port 76 is aligned with a respective one of the passage openings 42; e.g., 42A. The port 76 of FIG. 1, for example, at least partially or completely longitudinally overlaps and at least partially or completely circumferentially overlaps the respective passage opening 42A to provide a (e.g., unobstructed) fluid coupling between the respective component fluid passage 38A and the diverter fluid passage 80. A portion of the base sidewall 78, however, may at least partially or completely block off the other passage opening 42B. The base sidewall 78 of FIG. 1, for example, completely longitudinally and circumferentially covers/overlaps the other passage opening 42B. The base sidewall 78 may thereby substantially or completely fluidly decouple the other component fluid passage 38B from the receptacle 30 and the diverter fluid passage 80. In addition, the receptacle plug 72 plugs a portion of the receptacle 30 at (e.g., on, adjacent or proximate) the base distal end 88 and/or the receptacle second end 52. This portion of the receptacle 30 is located longitudinally between the passage openings 42 and the receptacle second end 52. The receptacle plug 72 thereby fluidly decouples the component fluid passages 38 from an internal plenum 94 within the case wall 24.

In some embodiments, the fluid diverter 22 may be configured with one or more annular seal elements 96 and 98; see also FIG. 5. Each seal element 96, 98 may be configured as a ring seal such as, but not limited to, an O-ring element, a C-seal element, a crush seal element, a washer, etc. The port 76 and the passage openings 42 of FIG. 1 are positioned longitudinally along the longitudinal centerline 46 between the first (e.g., outer) seal element 96 and the second (e.g., inner) seal element 98.

The first seal element 96 of FIG. 5 is mounted on and circumscribes the diverter base 64 on the longitudinal first side 84 of the port 76. The first seal element 96 of FIGS. 1 and 2 is laterally engaged with the diverter base 64 and the receptacle sidewall in the receptacle threaded portion 54. The first seal element 96 may thereby form a seal interface between the fluid diverter 22 and the engine component 20 such that fluid, for example, does not leak (e.g., in an outward direction; vertically up in FIG. 1) between the elements 20 and 22 into an external plenum 100.

The second seal element 98 of FIG. 5 is mounted on and circumscribes the diverter base 64 on the longitudinal second side 86 of the port 76. This second seal element 98 may also be seated within a groove 102 (see FIG. 7) in an exterior of the receptacle plug 72. The second seal element 98 of FIGS. 1 and 2 is laterally engaged with the diverter base 64 and the receptacle sidewall in the receptacle non-threaded portion 56. The second seal element 98 may thereby form a seal interface between the fluid diverter 22 and the engine component 20 such that fluid, for example, does not leak (e.g., in an inward direction; vertically down in FIG. 1) between the elements 20 and 22 into the internal plenum 94.

Figure 9:
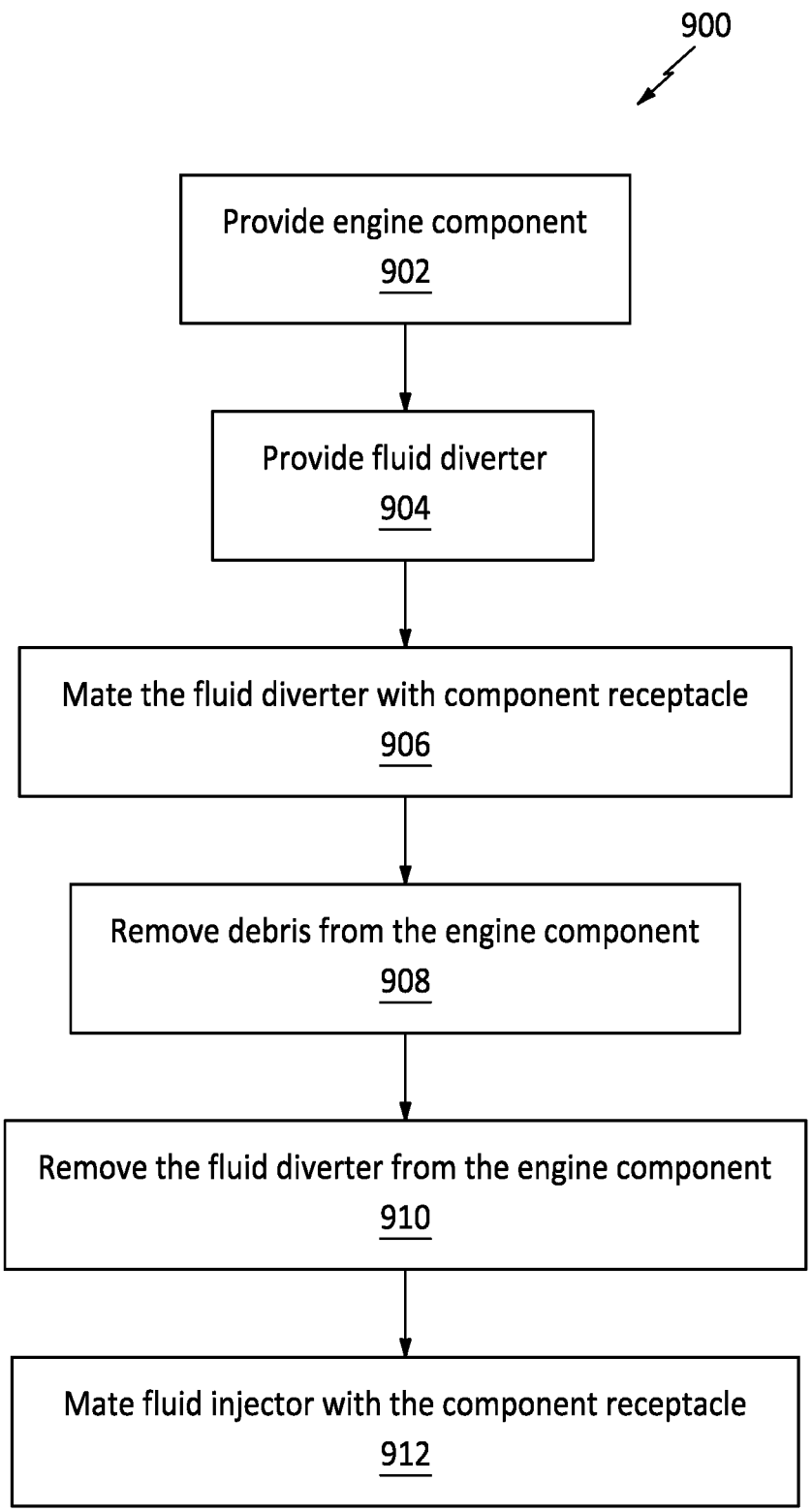
FIG. 9 is a flow diagram of a manufacturing method.

FIG. 9 is a flow diagram of a manufacturing method 900. For ease of description, this method 900 is described below with reference to the fluid diverter 22 and the engine component 20 described above. The method 900, however, is not limited to such an exemplary fluid diverter or to such an exemplary engine component.

In step 902, the engine component 20 is provided. The engine component 20, for example, may be formed via additive manufacturing. For example, layers of powered may be iteratively deposited and selectively sintered to additively form/build-up the engine component 20 layer-by-layer. Following this formation process, internal volumes within the engine component 20 such as the fluid passages 38 and the receptacle 30 may be filled with left over un-sintered powder. Traditional powder evacuation techniques may be employed to remove the bulk of this left over powder; however, some of the left over powder may remain within the engine component 20. In addition or alternatively, machining operations (e.g., tapping of the receptacle 30, etc.) may leave machining remnants (e.g., chips, grindings, etc.) behind within the engine component 20. Such debris (e.g., powder, remnants, etc.) within the internal volumes of the engine component 20 may negatively affect engine component operation. The method 900 therefore facilitates removal of the debris as described below.

In step 904, the fluid diverter 22 is provided. The fluid diverter 22, for example, may be additively manufactured, cast, machined and/or otherwise forms as a single integral, unitary body. A non-monolithic body, by contrast, include parts that are discretely formed from one another, where those parts are subsequently mechanically fastened and/or otherwise attached to one another.

In step 906, the fluid diverter 22 is mated with the receptacle 30. This mating fluidly couples a respective one of the component fluid passages 38A with the diverter fluid passage 80. The mating plugs the receptacle 30 at or about the receptacle second end 52. The mating may also block the passage opening 42B to the other component fluid passage 38B coupled with the receptacle 30.

In step 908, the debris is removed from the engine component 20. In particular, fluid is directed through the component fluid passage 38A and into the fluid diverter 22. This fluid may be a cleaning solution or another liquid that is operable to dislodge and/or carry at least some or all of the debris within the component fluid passage 38A. Directing the fluid through the component fluid passage 38A may thereby clean the debris out the component fluid passage 38A. The fluid carrying the debris flows out of the component fluid passage 38A, through the port 76, and into the diverter fluid passage 80. The diverter fluid passage 80 directs this fluid and the debris out of the engine component 20, for example, into the external plenum 100 or into another conduit (not shown) fluidly coupled with the fluid diverter 22 outside of the engine component 20. With this process, at least some or all of the debris within the component fluid passage 38 may be removed from the engine component 20.

By using the fluid diverter 22, the debris may be removed from the component fluid passage 38A and directed out of the engine component 20 without, for example, directing the debris through any other internal volumes of the engine component 20. For example, by plugging the receptacle 30 with the receptacle plug 72 and/or blocking off the passage opening 42B to the other component fluid passage 38B, the debris carrying fluid may not flow further (e.g., deeper) into the engine component 20. This may reduce or prevent depositing the debris into possibly otherwise debris free areas and/or adding to the debris in those other areas.

Figure 10A:
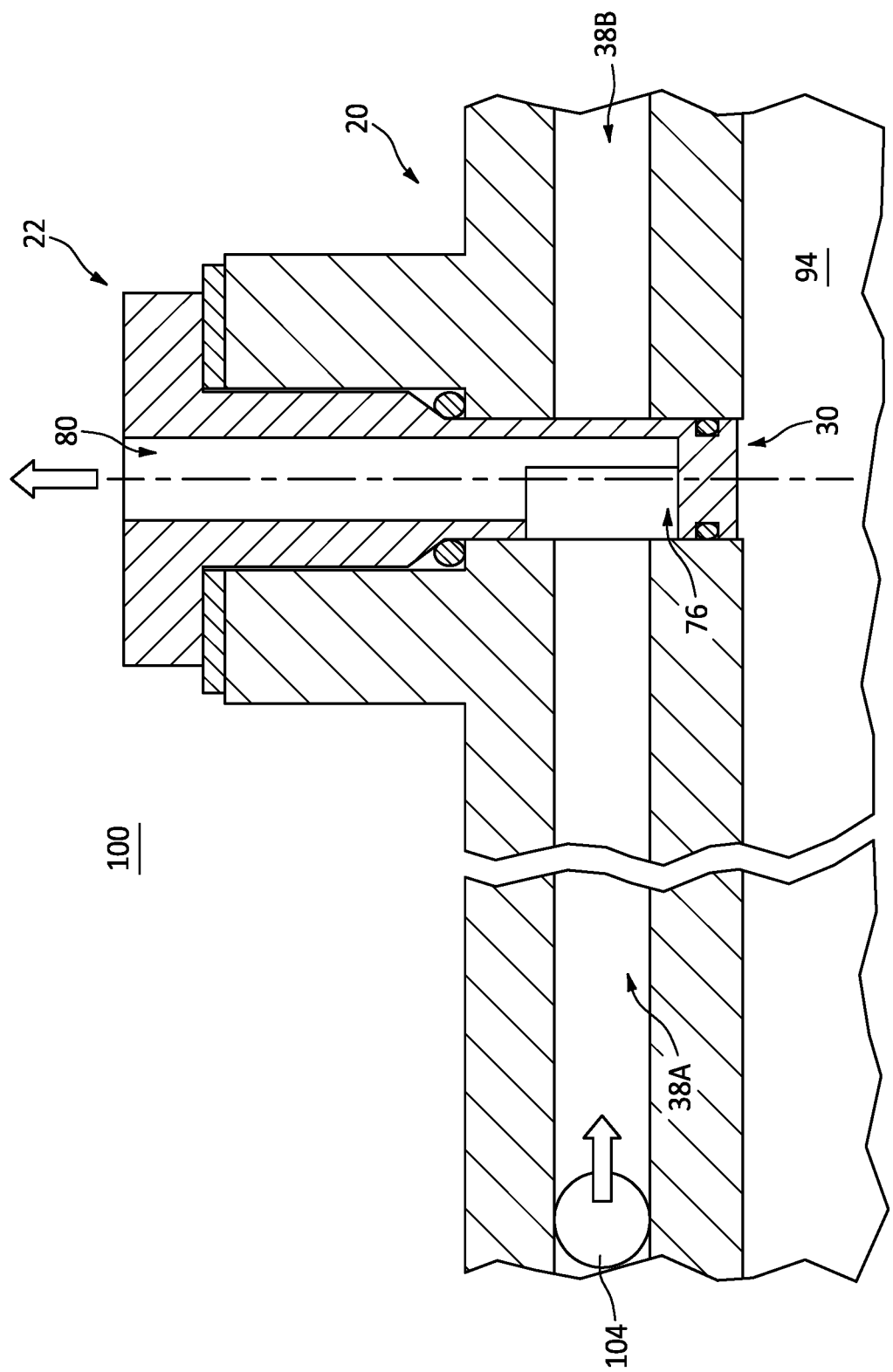
FIG. 10A is a partial sectional illustration of the fluid diverter mated with the engine component, where the engine component is configured with a fluid supply inlet.
Figure 10B:
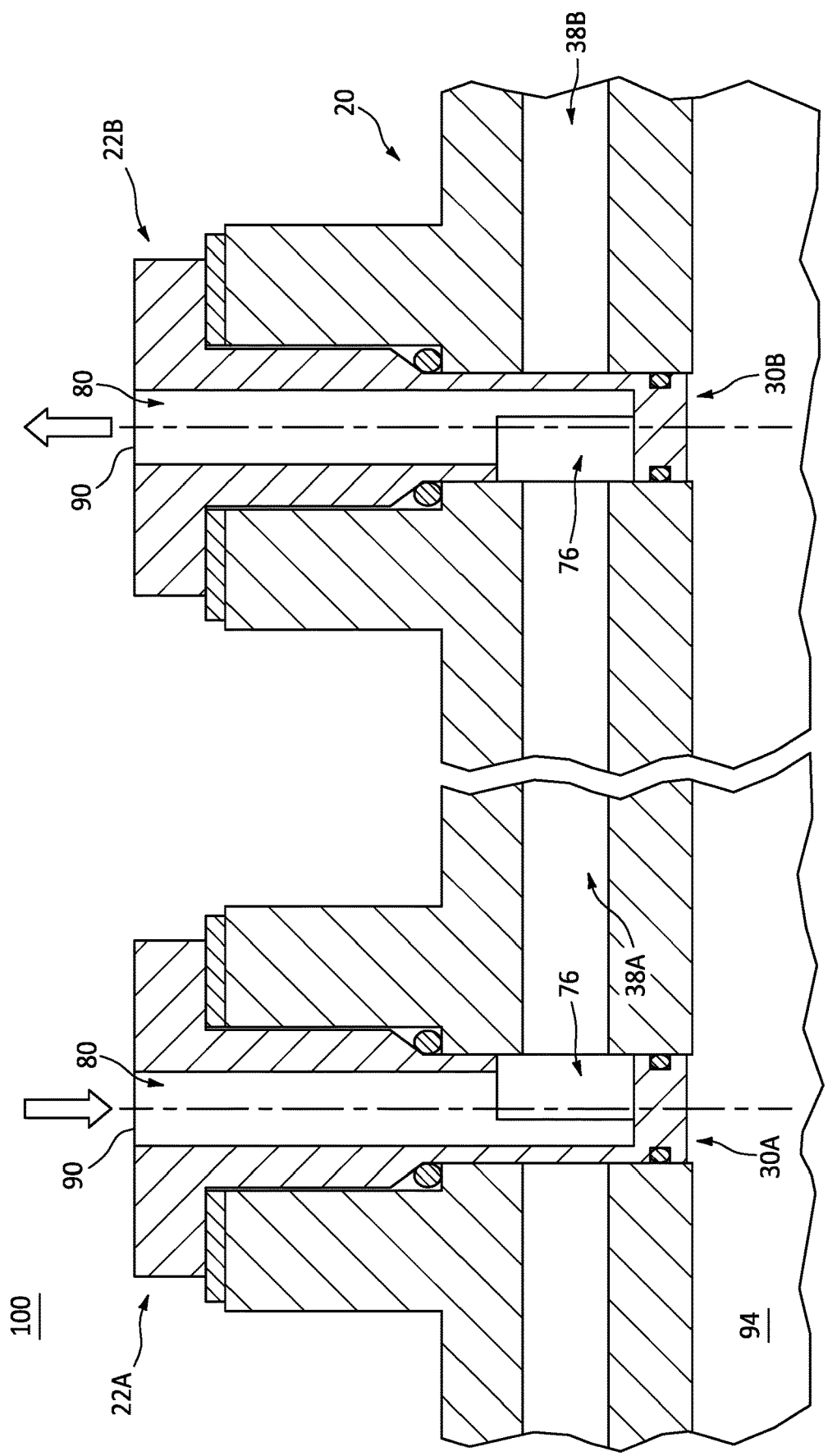
FIG. 10B is a partial sectional illustration of the fluid diverter mated with the engine component, where a second fluid diverter is also mated with the engine component.

Referring to FIG. 10A, the fluid may be directed into the component fluid passage 38A through an inlet 104 to the engine component 20; e.g., a manifold inlet. The fluid may also or alternatively be directed into the component fluid passage 38A through another device. For example, referring to FIG. 10B, another fluid diverter 22A may be mated with another receptacle 30A of the engine component 20. Here, the component fluid passage 38A extends between and to the upstream receptacle 30A and the downstream receptacle 30B. The upstream fluid diverter 22A functions as an inlet device for introducing the (e.g., clean, debris free) fluid into the engine component 20 and its component fluid passage 38A. The downstream fluid diverter 22B functions as an outlet device (as already described above) for extracting the (e.g., dirty, debris carrying) fluid out of the engine component 20 and its component fluid passage 38A.

Following the removal of the debris from the component fluid passage 38, one or more of the foregoing steps may be repeated to remove debris from one or more other internal volumes within the engine component 20. For example, the fluid diverter 22 may be clocked (e.g., 180 degrees) within the receptacle 30 in order to remove debris from the other component fluid passage 38B. In addition or alternatively, the fluid diverter 22 (or another fluid diverter 22) may be mated with another receptacle 30 within the engine component 20 to remove debris from the component fluid passage(s) 38 leading to that receptacle 30.

In step 910, the fluid diverter 22 is removed from the engine component 20 following the removal of the debris from the component fluid passage(s) 38/the engine component 20.

In step 912, a fluid injector 106 (e.g., a fuel injector bolt) is mated with each receptacle 30. For example, referring to FIG. 11, the injector 106 may be inserted into the receptacle 30 and attached to the engine component 20 in a similar fashion as described above with respect to the fluid diverter 22. However, whereas the fluid diverter 22 plugs the receptacle 30 at or about the receptacle second end 52 and directs fluid (e.g., cleaning solution) outward into the external plenum 100 for example (see FIGS. 1 and 2), the injector 106 plugs the receptacle 30 at or about the receptacle first end 50 and directs fluid (e.g., fuel) inwards into the internal plenum 94 (or another volume) for example.

While the engine component 20 is described as being formed using additive manufacturing, the method 900 is not limited to any particular engine component manufacturing technique. For example, the engine component 20 may alternatively be cast, machined and/or otherwise formed. The step 908 may then be used to remove, for example, machining remnants from the engine component 20.

Figure 12:
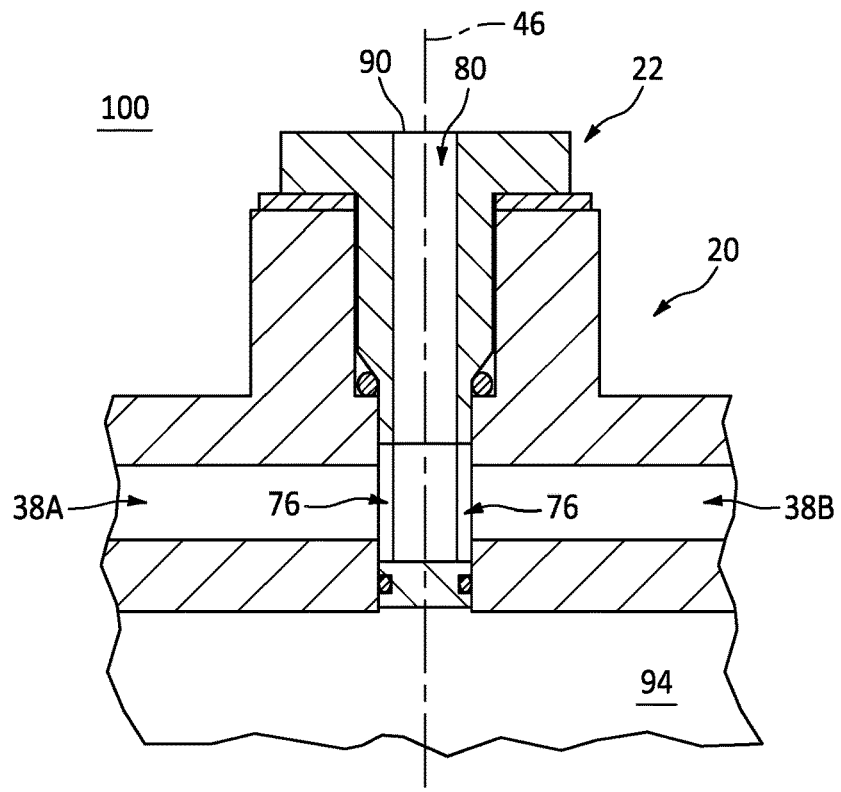
FIG. 12 is a partial sectional illustration of the fluid diverter mated with the engine component, where the fluid diverter fluidly couples a plurality of internal fluid passages within the engine component.

In some embodiments, referring to FIG. 12, the fluid diverter 22 may be clocked (e.g., 90 degrees) about the longitudinal centerline 46 such that the port 76 fluidly couples multiple component fluid passages 38 to the diverter fluid passage 80. With such an arrangement, some of the fluid (e.g., cleaning solution) received from the upstream component fluid passage 38A may be directed through the diverter fluid passage 80 and out of the engine component 20 to remove the debris. Some of the fluid may also be directed into and through the downstream component fluid passage 38B to dislodge and/or carry away debris within that component fluid passage 38.

In some embodiments, referring to FIG. 8, the port 76 has a circumferential width 108 that extends circumferentially about the longitudinal centerline 46 between two radians (~115 degrees) and four radians (~229 degrees). This circumferential width 108 may be selected to provide unobstructed fluid communication between the respective component fluid passage(s) 38 and the diverter fluid passage 80 (see FIG. 1) even where, for example, the fluid diverter 22 is slightly mis-clocked; e.g., mis-aligned. The present disclosure, however, is not limited to such an exemplary circumferential width 108. For example, in other embodiments, the circumferential width 108 may be between one radian (~57 degrees) and two radians (~115 degrees), less than one radian (~57 degrees) or greater than four radians (~229 degrees).

Figure 13:
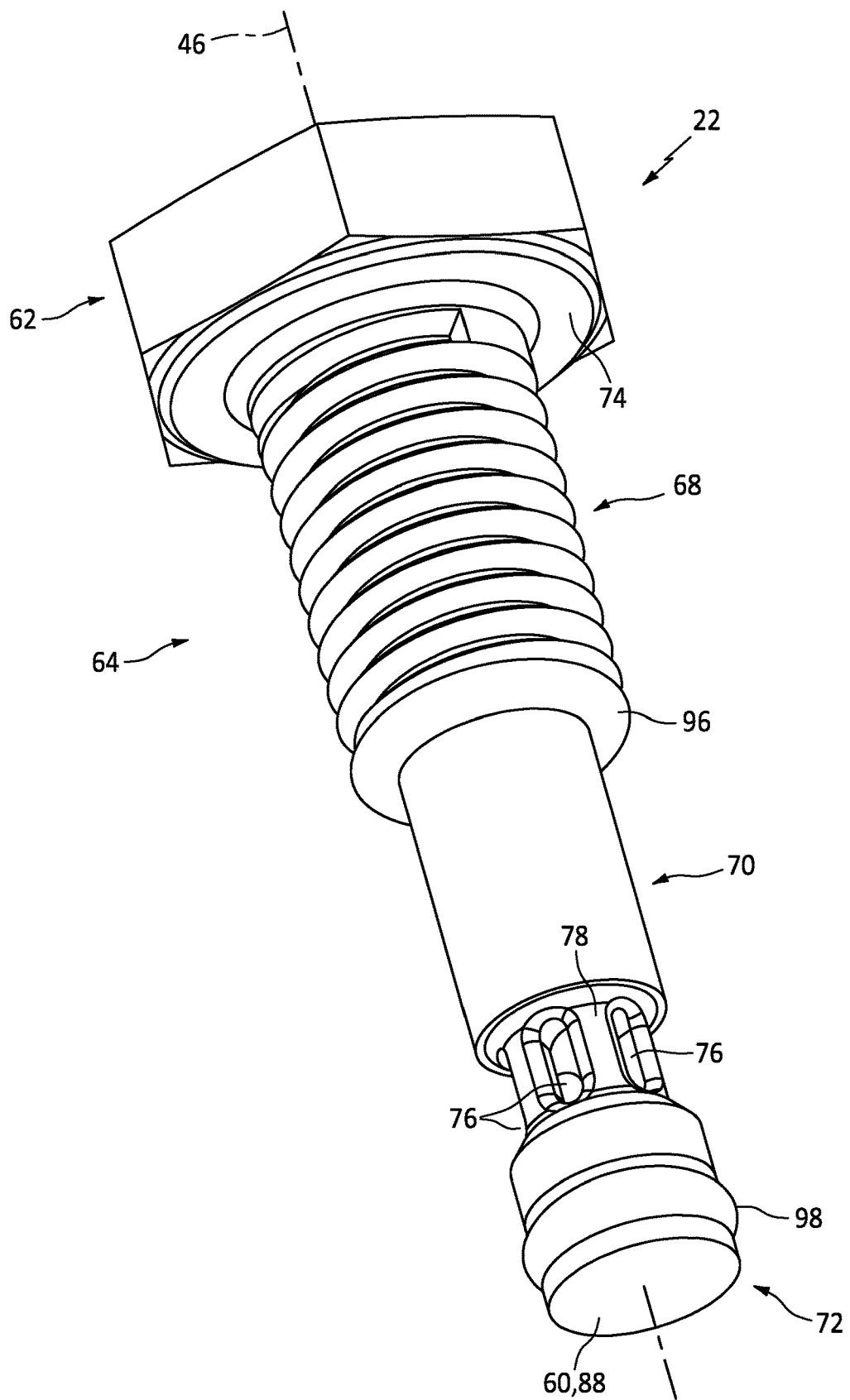
FIG. 13 is a perspective illustration of the fluid diverter configured with multiple ports, where the fluid diverted is mated with one or more seal elements.

In some embodiments, referring to FIG. 13, the fluid diverter 22 may be configured with more than one port 76. These ports 76 may be distributed circumferentially about the longitudinal centerline 46 in, for example, an annular array. Each of these ports 76 extends laterally through the base sidewall 78, circumferentially within the sidewall 78 and longitudinally within the sidewall 78 similarly as described above. The ports 76 of FIG. 13 are longitudinally aligned along the longitudinal centerline 46, and symmetrically disposed (e.g., equi-circumferentially spaced) about the longitudinal centerline 46. The present disclosure, however, is not limited to such an exemplary arrangement.

In some embodiments, referring to FIG. 1, the fluid diverter 22 may include an indicator 109. This indicator 109 is configured to visually identify a location of a respective port 76 where the fluid diverter 22 is mated with the engine component 20 and the port 76 is hidden from view. The indicator 109 may be configured as a protrusion which projects out from the diverter head 62. Examples of such a protrusion include, but are not limited to, a rib and a point protrusion. The indicator 109 may alternatively be configured as a depression which projects into the diverter head 62. Examples of such a depression include, but are not limited to, a groove and a dimple.

The fluid diverter 22 may be constructed from various materials. The fluid diverter 22, for example, may be constructed from metal and/or non-metal materials; e.g., a polymer.

The method 900 is described above with respect to manufacturing the engine component 20. However, in other embodiments, various steps may be performed to service the engine component 20. The method 900 may thereby also be performed as a maintenance and/or repair method.

Figure 14:
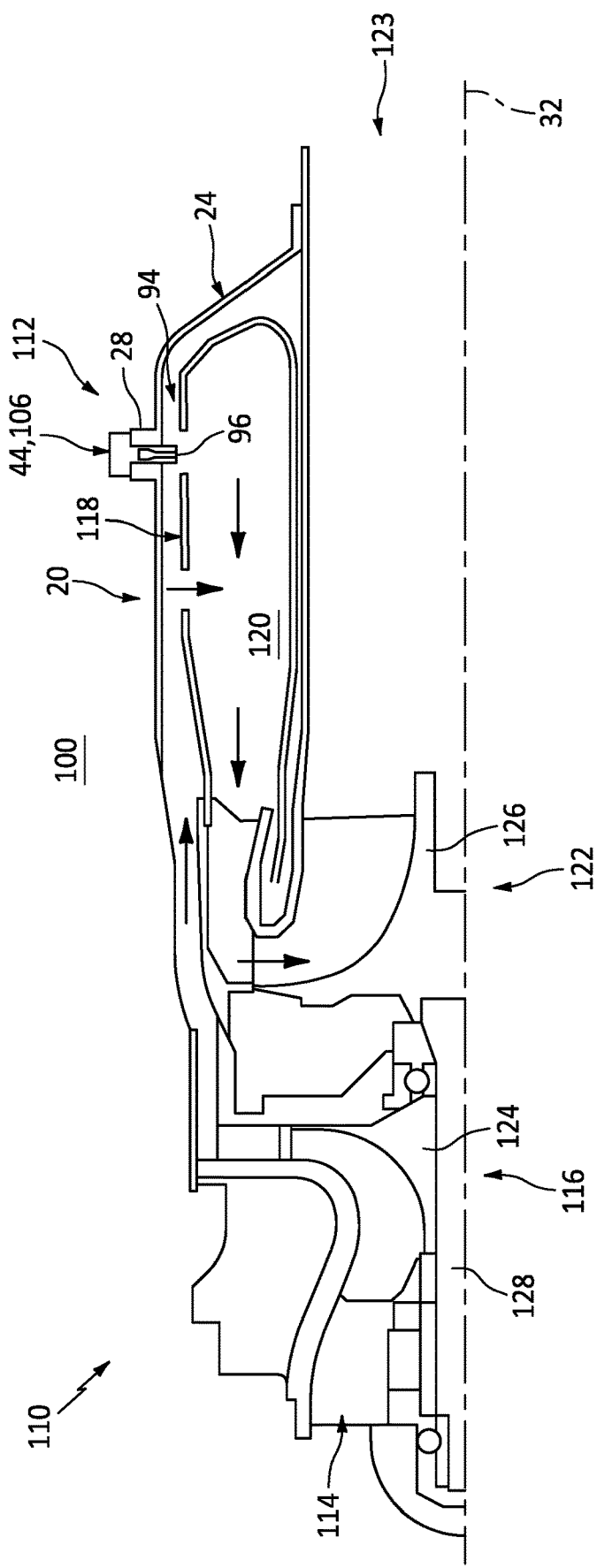
FIG. 14 is a schematic illustration of a gas turbine engine.

FIG. 14 schematically illustrates a single spool, radial-flow turbojet turbine engine 110 with which an assembly 112 of the engine component 20 and the fuel injector(s) 44 may be included. This turbine engine 110 may be configured for propelling an unmanned aerial vehicle (UAV), a drone, or any other manned or unmanned aircraft or self-propelled projectile. In the specific embodiment of FIG. 14, the turbine engine 110 includes an upstream inlet 114, a (e.g., radial) compressor section 116, a combustor section 118 with a (e.g., annular) combustor and a (e.g., annular) combustion chamber 120, a (e.g., radial) turbine section 122 and a downstream exhaust 123 fluidly coupled in series. A compressor rotor 124 in the compressor section 116 is coupled with a turbine rotor 126 in the turbine section 122 by a shaft 128, which shaft 128 rotates about the centerline/rotational axis 32 of the turbine engine 110.

The engine assembly 112 may be configured for a gas turbine engine as described above. This gas turbine engine may be configured for propulsion and/or power generation. The gas turbine engine may be a geared turbine engine which includes a gear train connecting one or more shafts to one or more rotors in a fan section, a compressor section and/or any other engine section. Alternatively, the gas turbine engine may be a direct-drive turbine engine configured without a gear train. The gas turbine engine may be configured as a single spool or a multi-spool turbine engine. The gas turbine engine may be configured as a turbofan engine, a turbojet engine, a propfan engine, a pusher fan engine, an auxiliary power unit (APU), an industrial turbine engine or any other type of gas turbine engine. The present disclosure, however, is not limited to any particular types or configurations of gas turbine engines. Furthermore, the engine assembly 112 may alternatively be configured with various other types of internal combustion engines. For example, the engine component 20 may be configured as a case, a block, a head or another component of a reciprocating piston engine, a rotary engine, or any other type of engine where fuel is continuously or periodically injected into chamber or another internal volume for combustion.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. A method, comprising:
providing an engine component configured with a component fluid passage and a receptacle, the component fluid passage extending within the engine component to the receptacle, and the receptacle extending through the engine component between a receptacle first end and a receptacle second end;
providing a fluid diverter configured with a diverter fluid passage and a port, the fluid diverter extending between a diverter first end and a diverter second end, and the diverter fluid passage extending partially into the fluid diverter from the diverter first end;
mating the fluid diverter with the receptacle, the diverter first end disposed at the receptacle first end, the diverter plugging a portion of the receptacle at the diverter second end, and the port fluidly coupling the component fluid passage to the diverter fluid passage; and
directing fluid through the component fluid passage into the diverter fluid passage to remove debris from the engine component;
wherein the debris comprises material within the component fluid passage that is left over from manufacturing of the engine component.

2. The method of claim 1, wherein the engine component comprises a fuel manifold for a turbine engine.

3. The method of claim 1, wherein the engine component comprises a case for a turbine engine.

4. The method of claim 1, further comprising removing the fluid diverter from the receptacle subsequent to the directing of the fluid through the component fluid passage.

5. The method of claim 1, wherein the fluid diverter is configured as a bolt that threads into the receptacle during the mating of the fluid diverter with the receptacle.

6. The method of claim 1, wherein
the engine component is further configured with a second component fluid passage extending within the engine component to the receptacle; and
the fluid diverter blocks an opening to the second component fluid passage from the receptacle.

7. The method of claim 1, wherein
the engine component is further configured with a second component fluid passage extending within the engine component to the receptacle; and
the fluid diverter is further configured with a second port that fluidly couples the second component fluid passage to the diverter fluid passage.

8. The method of claim 1, further comprising:
providing a second fluid diverter configured with a second diverter fluid passage and a second port, the second fluid diverter extending between a second diverter first end and a second diverter second end, and the second diverter fluid passage extending partially into the second fluid diverter from the second diverter first end;
mating the second fluid diverter with a second receptacle that is fluidly coupled with the component fluid passage, the second receptacle extending through the engine component between a second receptacle first end and a second receptacle second end, the second diverter first end disposed at the second receptacle first end, the second diverter plugging a portion of the second receptacle at the second diverter second end, and the second port fluidly coupling the component fluid passage to the second diverter fluid passage; and
directing the fluid through the second diverter fluid passage and into the component fluid passage towards the diverter fluid passage.

9. The method of claim 1, wherein
the component fluid passage extends within the engine component to an opening in the receptacle;
the fluid diverter comprises a head and a shank, the shank projects out from the head to a distal end, the diverter fluid passage extends through the head and partially into the shank towards the distal end, and the port extends through a sidewall of the shank to the diverter fluid passage; and
the mating of the fluid diverter comprises threading the shank into the receptacle to attach the fluid diverter to the engine component.

10. The method of claim 9, wherein the head is configured with a wrenching feature.

11. The method of claim 9, wherein a threaded portion of the shank is between the head and the port.

12. The method of claim 9, wherein
the head is disposed at the receptacle first end; and
the shank plugs a portion of the receptacle between the opening and the receptacle second end.

13. A method, comprising:
providing an engine component configured with a component fluid passage and a receptacle, the component fluid passage extending within the engine component to the receptacle, and the receptacle extending through the engine component between a receptacle first end and a receptacle second end;
providing a fluid diverter configured with a diverter fluid passage and a port, the fluid diverter extending between a diverter first end and a diverter second end, and the diverter fluid passage extending partially into the fluid diverter from the diverter first end;
mating the fluid diverter with the receptacle, the diverter first end disposed at the receptacle first end, the diverter plugging a portion of the receptacle at the diverter second end, and the port fluidly coupling the component fluid passage to the diverter fluid passage; and
directing fluid through the component fluid passage into the diverter fluid passage to remove debris from the engine component;
wherein the providing of the engine component comprises additively manufacturing the engine component; and
wherein the debris comprises powder within the component fluid passage that is left over from the additively manufacturing of the engine component.

14. A method, comprising:
providing an engine component configured with a component fluid passage and a receptacle, the component fluid passage extending within the engine component to the receptacle, and the receptacle extending through the engine component between a receptacle first end and a receptacle second end;

providing a fluid diverter configured with a diverter fluid passage and a port, the fluid diverter extending between a diverter first end and a diverter second end, and the diverter fluid passage extending partially into the fluid diverter from the diverter first end;

mating the fluid diverter with the receptacle, the diverter first end disposed at the receptacle first end, the diverter plugging a portion of the receptacle at the diverter second end, and the port fluidly coupling the component fluid passage to the diverter fluid passage;

directing fluid through the component fluid passage into the diverter fluid passage to remove debris from the engine component;

removing the fluid diverter from the receptacle subsequent to the directing of the fluid through the component fluid passage; and mating an injector with the receptacle subsequent to the removal of the fluid diverter from the receptacle, the injector plugging a portion of the receptacle at the receptacle first end.

\* \* \* \* \*